(12) United States Patent
Delerablee et al.

(10) Patent No.: US 9,294,273 B2
(45) Date of Patent: Mar. 22, 2016

(54) METHOD AND SYSTEM FOR CONDITIONAL ACCESS TO A DIGITAL CONTENT, ASSOCIATED TERMINAL AND SUBSCRIBER DEVICE

(75) Inventors: Cécile Delerablee, Paris (FR); Aline Gouget, Paris (FR); Pascal Paillier, Paris (FR)

(73) Assignee: CRYPTOEXPERTS SAS, Paris (FR)

( * ) Notice: Subject to any disclaimer, the term of this patent is extended or adjusted under 35 U.S.C. 154(b) by 139 days.

(21) Appl. No.: 13/994,380

(22) PCT Filed: Dec. 16, 2011

(86) PCT No.: PCT/FR2011/053040
§ 371 (c)(1),
(2), (4) Date: Aug. 15, 2013

(87) PCT Pub. No.: WO2012/080683
PCT Pub. Date: Jun. 21, 2012

(65) Prior Publication Data
US 2013/0326211 A1    Dec. 5, 2013

(30) Foreign Application Priority Data
Dec. 17, 2010    (FR) .................................... 10 60770

(51) Int. Cl.
*H04L 29/00*    (2006.01)
*H04L 9/08*    (2006.01)
*H04L 9/30*    (2006.01)

(52) U.S. Cl.
CPC .............. *H04L 9/0866* (2013.01); *H04L 9/088* (2013.01); *H04L 9/0822* (2013.01); *H04L 9/0847* (2013.01); *H04L 9/0894* (2013.01); *H04L 9/3073* (2013.01); *H04L 2209/60* (2013.01)

(58) Field of Classification Search
CPC ... H04L 9/0822; H04L 9/0847; H04L 9/0866; H04L 2209/603; H04L 2209/605
See application file for complete search history.

(56) References Cited

U.S. PATENT DOCUMENTS

| | | | |
|---|---|---|---|
| 2002/0114465 A1* | 8/2002 | Shen-Orr et al. | .............. 380/231 |
| 2004/0111611 A1* | 6/2004 | Jin | ............................ G09C 5/00 713/163 |

(Continued)

FOREIGN PATENT DOCUMENTS

| | | |
|---|---|---|
| EP | 1 662 789 A1 | 5/2006 |
| EP | 2 207 340 A1 | 7/2010 |

(Continued)

OTHER PUBLICATIONS

International Search Report (PCT/ISA/210) issued on Jul. 10, 2012, by the French Patent Office as the International Searching Authority for International Application No. PCT/FR2011/053040.

(Continued)

*Primary Examiner* — Hadi Armouche
*Assistant Examiner* — Sher A Khan
(74) *Attorney, Agent, or Firm* — Buchanan Ingersoll & Rooney PC

(57) ABSTRACT

The invention relates to a method and a system for conditional access making it possible to prevent the fraudulent use of a subscriber electronic device ($1a$, $1b$, $1m$) and to thus effectively combat the fraudulent making available of protected contents. The invention further relates to the adaptation of such a device as well as to a method allowing the revocation of the latter if it is deemed to be illicitly exploited or its possible reinstatement.

17 Claims, 5 Drawing Sheets

(56) References Cited

U.S. PATENT DOCUMENTS

| | | | |
|---|---|---|---|
| 2004/0249663 A1* | 12/2004 | Shishido | 705/1 |
| 2006/0117392 A1 | 6/2006 | Courtin et al. | |
| 2007/0076870 A1* | 4/2007 | Takashima et al. | 380/200 |
| 2008/0028450 A1* | 1/2008 | Zhao et al. | 726/6 |
| 2008/0031246 A1* | 2/2008 | Hasha | H04L 29/12103 370/390 |
| 2008/0256615 A1* | 10/2008 | Schlacht | H04N 7/162 726/9 |
| 2009/0028327 A1* | 1/2009 | Pinder | 380/212 |
| 2009/0323949 A1 | 12/2009 | Chieze et al. | |
| 2010/0293378 A1* | 11/2010 | Xiao | H04L 63/205 713/168 |
| 2011/0317833 A1* | 12/2011 | Westerveld et al. | 380/210 |
| 2012/0207300 A1* | 8/2012 | Karroumi | H04L 9/0836 380/44 |

FOREIGN PATENT DOCUMENTS

| | | |
|---|---|---|
| WO | WO 2008/023023 A1 | 2/2008 |
| WO | WO 2009/112966 A2 | 9/2009 |

OTHER PUBLICATIONS

Written Opinion (PCT/ISA/237) issued on Jul. 10, 2012, by the French Patent Office as the International Searching Authority for International Application No. PCT/FR2011/053040.

* cited by examiner

METHOD AND SYSTEM FOR CONDITIONAL ACCESS TO A DIGITAL CONTENT, ASSOCIATED TERMINAL AND SUBSCRIBER DEVICE

The invention relates to a system and method for conditional access to digital content making it possible to prevent the use of a legally acquired and authentic electronic device by a hacker terminal. The invention thus allows to effectively fight against the fraudulent provision of protected multimedia content.

The invention further relates to the adaptation of such devices as well as a method for respectively initiating the temporary or permanent revocation of an electronic device or the possible rehabilitation of the latter. The invention further relates to the adaptation of a terminal to allow the implementation of the conditional access method.

An operator broadcasting digital content generally works with a Conditional Access System (CAS) to provide protected content to one or more subscribers. Such a system generally relies on secure electronic devices, such as smart cards, to host the identities and/or rights of the subscribers and to perform encryption, decryption or number generation operations.

According to the known conditional access systems, to broadcast protected multimedia content, encrypted control words c and encoded contents C are transmitted through a broadcast network, at regular intervals or cryptoperiods, at least, which are known and mastered by the broadcast operator. An encrypted control word is generally obtained using an encryption function E such that $c=E(k)$, k being the value of said control word. Encoded content C is obtained using an encoding function enc and said control word k, such that $C=enc(k,M)$, M being the plain text of the multimedia content. As an example, the encoding function may be in accordance with standard DVB-CSA (Digital Video Broadcasting-Common Scrambling Algorithm). To be able to view or listen to protected content, individuals must obtain a subscription. A subscriber receives a dedicated device, generally in the form of a smart card, which, coupled to a terminal, generally called a decoder or "set-top box", allows that subscriber to decode protected content. The encrypted control words c are traditionally decrypted using a subscriber device that supplies the control words k to the terminal. The latter is responsible for decoding encoded content C and allows, using a suitable man-machine interface—for example, a home television set—to access the plain text M of the content.

Typically, "hackers" try to generate an illicit trade seeking to use a pirate network to transmit decrypted control words k making it possible to decode protected content C using a terminal adapted for that purpose. The first threats and attacks led hackers to try to "break" the security of subscriber electronic devices. Through knowledge of the cryptographical material, algorithms or secrets, a hacker can then "clone" or emulate such a device and make certain "reproductions" available to dishonest subscribers.

The increasing and quasi-inviolable robustness of such devices have led hackers to legally acquire subscriber devices (such as smart cards) and design pirate terminals, capable of cooperating with said devices and transmitting decrypted control words k, in real-time, over a pirate network or channel using techniques known as "control-word sharing". This control-word sharing technique, which aims to transmit decrypted control words, is particularly valued because it allows to use a pirate network with a low bandwidth because the size of the control words is generally much smaller than the size of the decoded content.

To thwart the hackers, the operators generally manage to ascertain the existence of such a pirate network. By obtaining a subscription from a hacker, an operator can even obtain a "cloned" or emulated device and study it. However, given that the control word k, which allows accessing the plain text of the multimedia content, is identical for all subscribers (or for a large group of subscribers), it is not possible to identify the origin of the fraud from a control word that has been disclosed on the pirate network. There are therefore no known methods making it possible to identify a device which, despite having been regularly and honestly acquired, is being used fraudulently.

The invention allows responding particularly effectively to the threat of control-word sharing. Among the many advantages provided by the invention, we may mention that the invention allows to remotely trace any subscriber device that has allowed to generate a control word whereof the value can be transmitted over a hacker network. In fact, the invention allows providing a dedicated and distinct control word for each subscriber device. Observing such control word transmitted over a pirate network allows finding the subscriber device being used illegally. The invention further allows to remotely revoke such a device, called "traitor device", while continuing to broadcast content through the broadcast network. The invention thus offers any content broadcasting operator a particularly simple and effective tool to fight piracy. Furthermore, according to one preferred embodiment, a subscriber device only performs a small number of computations, the costly computations being done in the terminal provided to the subscriber and cooperating with said subscriber device.

To that end, a method is provided for generating a control word, implemented by processing means of a subscriber electronic device cooperating with a terminal, said device comprising receiving means for receiving data from the terminal and means for delivering said generated control word to the terminal. Said method comprises:
- a step for receiving data via the receiving means that consist of a tag t;
- a step for determining the current cryptoperiod by using the received tag t;
- a step for generating a control word from said current cryptoperiod cp and from a secret $SK_i$ stored by the device;
- a step for delivering a control word k' using the delivering means of the device.

To be able to trace any subscriber device having generated a control word whereof the value can be transmitted over a hacker network, the step for generating the control word of such a method consists of generating a traceable control word $k_{i,cp}$ whereof the value is distinct from that of a control word generated, for the current cryptoperiod cp, by any other subscriber device by integrating the value of an identifier i into the calculation of the word $k_{i,cp}$. Said value of the identifier i is stored by the device and distinct from that stored by any other subscriber device. The step for delivering the control word consists of delivering k' equal to $k_{i,cp}$.

To be able to revoke or render a subscriber device using such a method, the latter may include a prior step for authorizing the device to deliver a control word k' equal to the generated control word $k_{i,cp}$.

Optionally, to unburden a content server of this task, such a method may include a step for calculating and delivering a header H to allow in fine decoding of the encoded content by a terminal.

To implement a method for generating a traceable control word, the invention provides for adapting a subscriber electronic device cooperating with a terminal and comprising:
- receiving means for receiving data from the terminal;
- processing means for generating a control word from said data;
- means for delivering said control word to said terminal.

Such an adaptation consists of the device having storage means to store an identifier i, a secret $SK_i$. The processing and storage means are further suitable for generating and delivering a traceable control word k' using a method according to the invention.

According to a second object, the invention provides a method for decoding encoded content C and generating the plain text M of the content, said method being implemented by processing means of a terminal cooperating with means for receiving data from the outside world and means for delivering said plain text M of the content. According to the invention, said data consists of said encoded content C, a header H and a traceable control word $k_{i,cp}$ generated and delivered by a subscriber electronic device according to the invention. To allow content to be decoded, even when the control word is traceable and therefore distinct from one subscriber device to another, the decoding method comprises:
- a step for applying a first function F1 to the header H and the control word $k_{i,cp}$ to generate a word K independent of the identifier i of the device having generated and delivered the control word $k_{i,cp}$ by eliminating the contribution of said dedicated identifier i;
- a step for applying a second function F3 to said word K and the encoded content C to generate the plain text M of the content;
- a step for delivering said plain text M of the content via the delivering means of the terminal.

In order to implement a method for decoding encoded content C and generating the plain text M of the content, the invention provides for adapting an electronic terminal comprising:
- receiving means for receiving data from the outside world;
- processing means for generating the plain text M of the content from said data;
- means for delivering said plain text of the content to a man-machine interface suitable for rendering said plain text of the content;
- means for cooperating with a subscriber electronic device according to the invention.

The data received from the outside world consists then of an encoded content C, a header H and a tag t. The means for cooperating with said subscriber electronic device transmit the latter said tag t and in return receive a traceable control word $k_{i,cp}$ that is generated and delivered according to the invention. The terminal further comprises processing means suitable for decoding and delivering the plain text M of the content using a method according to the invention.

According to a third object, the invention provides a method for encoding the plain text M of the content and generating an encoded content C, said method being implemented by processing means of a server comprising means for delivering said encoded content C to a terminal according to the invention and cooperating with a subscriber device, also according to the invention. Such a method comprises:
- a step for generating encoded content C from a cryptoperiod cp and a secret MK known by the server;
- a step for generating a tag t to characterize the cryptoperiod cp from which the encoded content C was generated and allowing the device to generate and deliver a traceable control word according to the invention;
- a step for calculating and delivering a header H to enable decoding of the content encoded by the terminal according to the invention;
- a step for jointly delivering said encoded content C, the header H and said tag t.

To implement such a method, the invention provides for adapting the processing means of a server so that they implement said method to generate and deliver encoded content C from the plain text of the content, a cryptoperiod cp and a secret MK, a tag t and a header H.

The invention provides a conditional access system for digital content comprising a server, terminal and electronic device respectively in accordance with the invention.

This invention further relates to a method for conditional access to digital content, comprising:
- a step for generating and delivering, by a server, an encoded content C, a tag t and a header H according to the invention;
- a step for receiving said encoded content C, tag t and header H by a terminal;
- a step for transmitting the tag t by the terminal to a device cooperating with said terminal;
- a step for generating and delivering, by said device to the terminal, a traceable control word $k_{i,cp}$ according to the invention;
- a step for the decoding by the terminal of the encoded content C and for generating the plain text M of the content according to the invention;
- a step for rendering said plain text M of the content using an interface adapted to said plain text of the content.

To observe a pirate network and identify an electronic device that is being used fraudulently, the invention provides a method for tracing a control word $k_{p,cp}$ generated by a traitor subscriber device using a method to generate a traceable control word according to the invention. Such a tracing method comprises:
- a step for collecting the control word $k_{p,cp}$;
- a step for collecting a utility or pirate decryption program capable of decoding encoded content using said control word $k_{p,cp}$;
- a step for determining an identifier i=p of a device having generated $k_{p,cp}$ consisting of:
  i. interpreting the utility or decryption program to design an equivalent program expressing a set of instructions in the form of algebraic and related operations each comprising at least one input variable and at least one output variable;
  ii. setting the input variables to constants so that the equivalent program decodes the encoded content correctly;
  iii. simplifying said equivalent program so that it only comprises one sequence of instructions without jumps;
  iv. converting the simplified equivalent program into a system of multivariate equations by using algebraic transformations;
  v. inverting all or part of said system of multivariate equations to identify the traitor device.

Other features and advantages will appear more clearly upon reading the following description and examining the figures accompanying it, in which.

Figure 3:
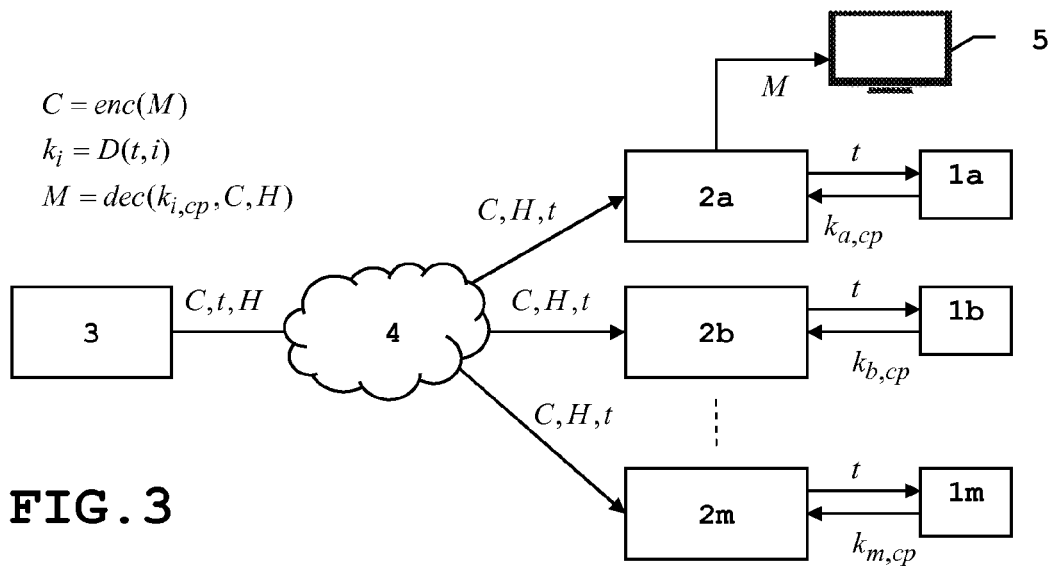
Figure 3A:
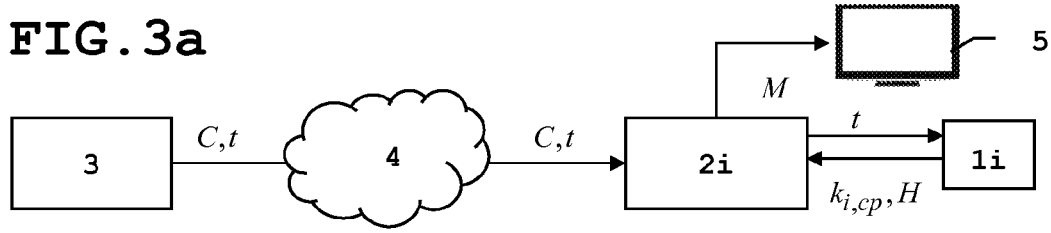
Figure 4:
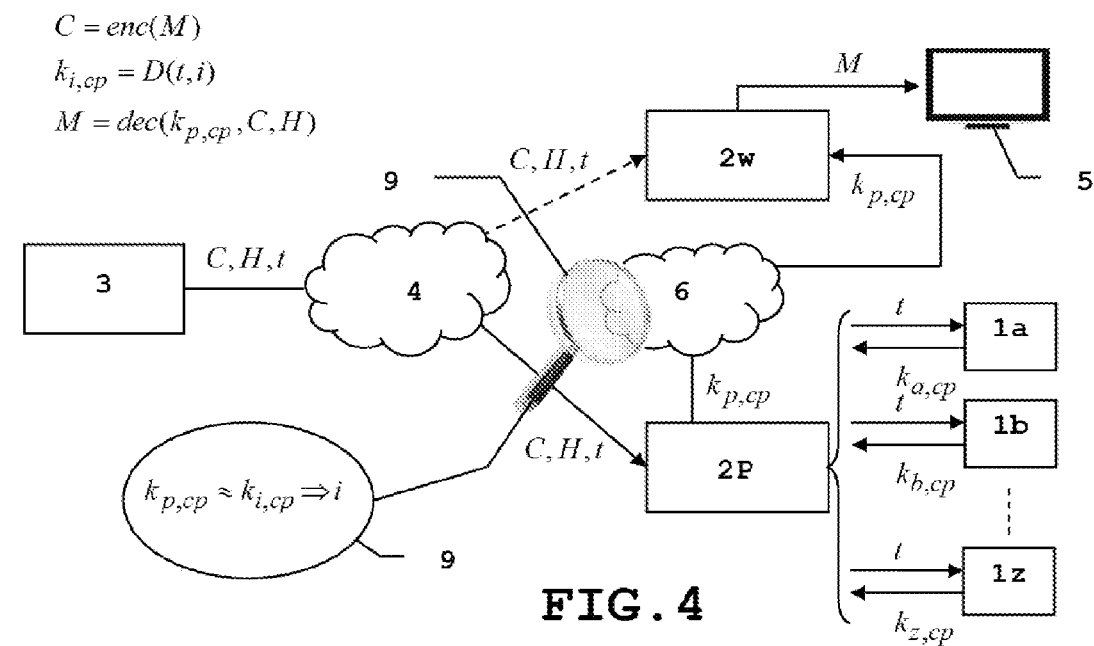
Figure 5:
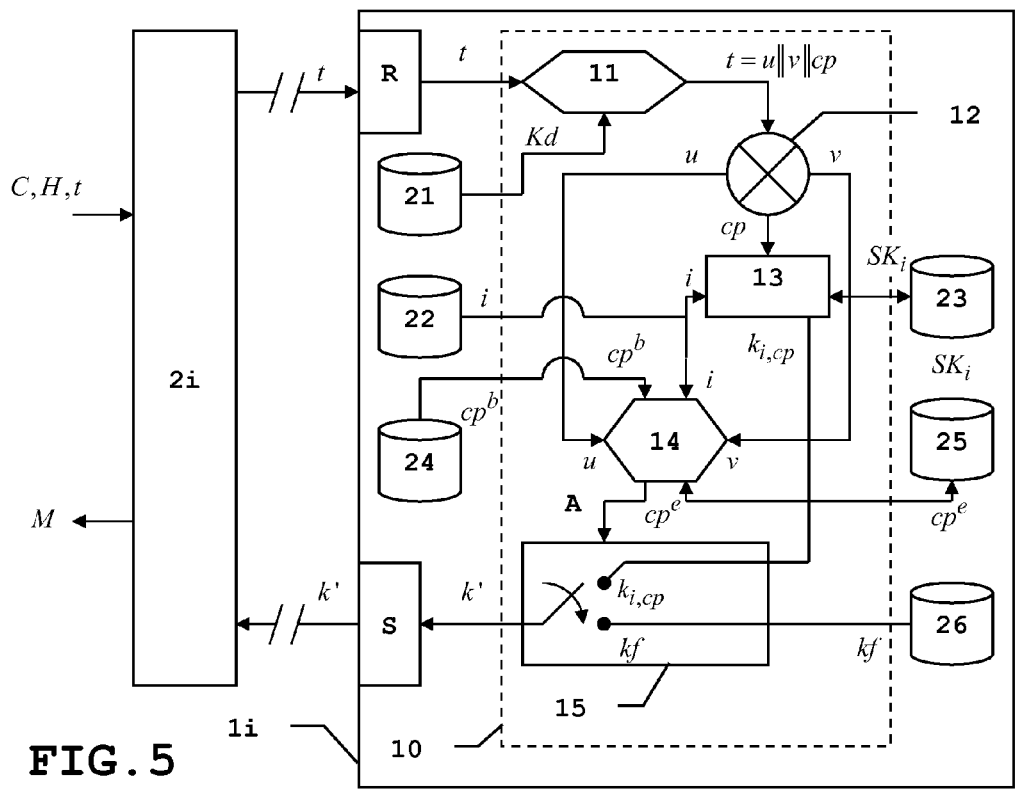
Figure 6:
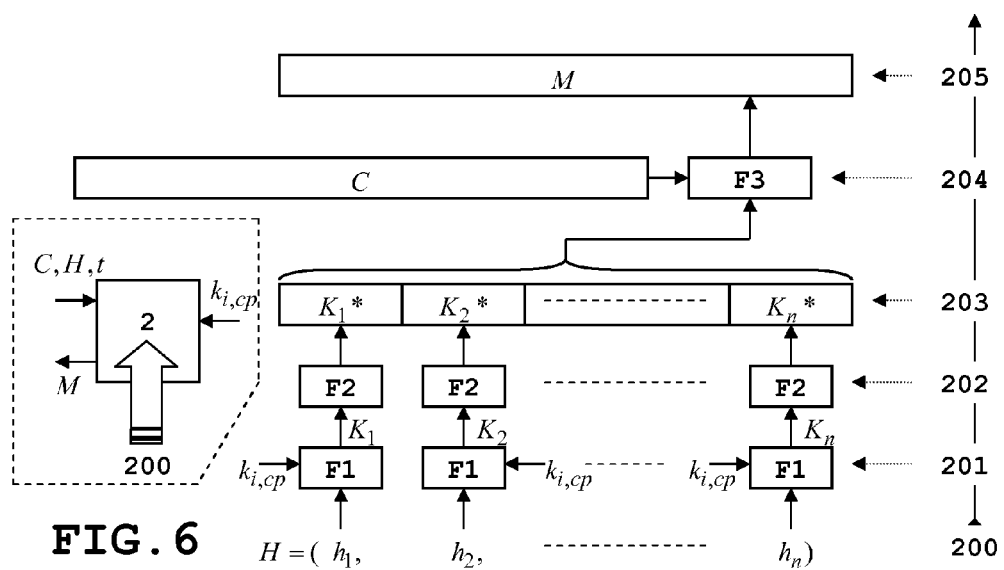
Figure 5A:
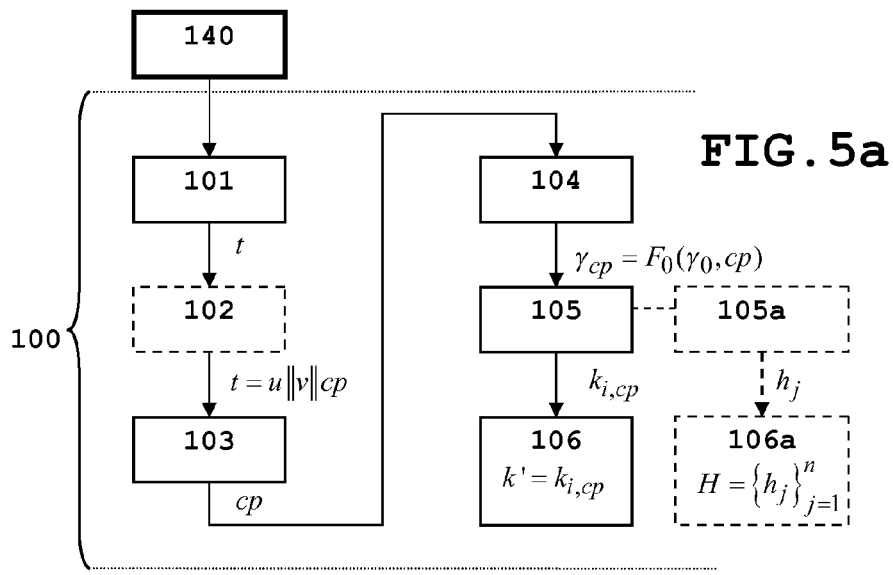
Figure 5B:
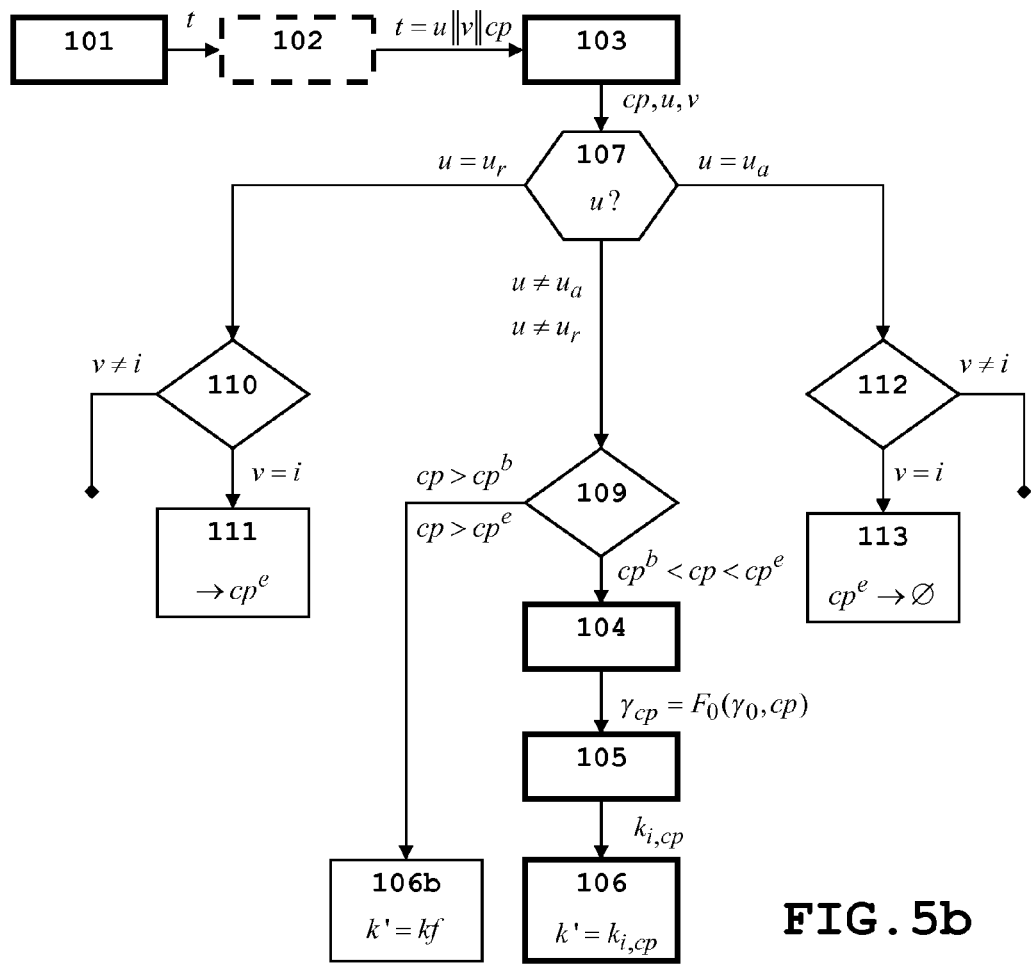
Figure 8:
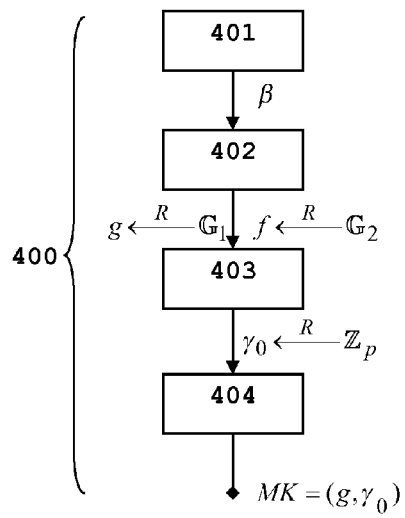
Figure 7:
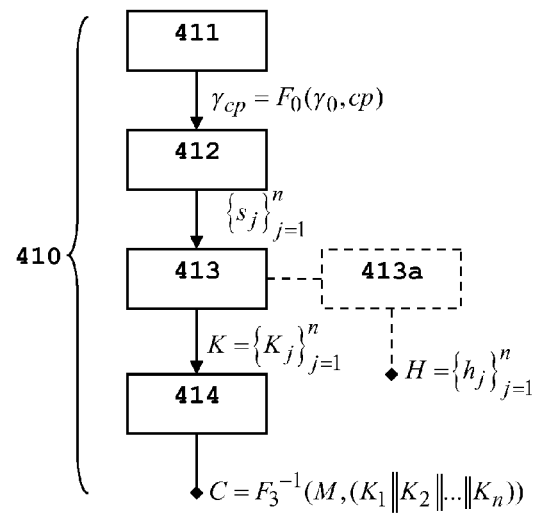
Figure 9:
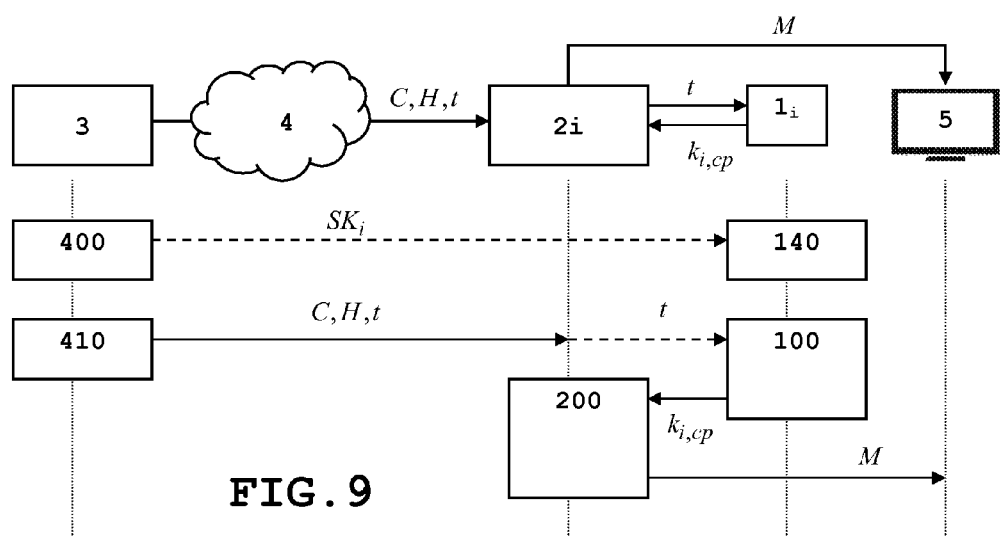

FIGS. 3 and 3a respectively describe two embodiments of a conditional access system according to the invention;

FIG. 4 describes the use, according to the invention, of a method to observe a private network and identify an electronic device being used fraudulently or a traitor device;

FIG. 5 illustrates the functional architecture of a subscriber electronic device according to the invention;

FIGS. 5a and 5b respectively illustrate two embodiments of a method for generating a control word according to the invention;

FIG. 6 describes a first preferred embodiment of a method for decoding encoded content, according to the invention;

FIG. 7 describes a first preferred embodiment of a method for encoding the plain text of a content, according to the invention;

FIG. 8 describes a first preferred embodiment of a method for generating a secret to use a conditional access system, according to the invention; and FIG. 9 describes one embodiment of a conditional access method according to the invention.

Figure 1:
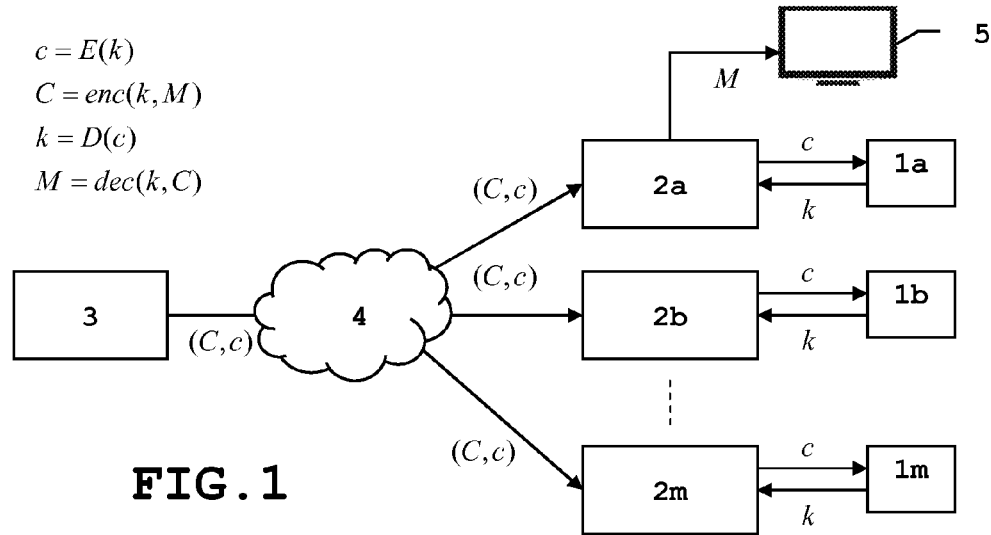
FIG. 1 shows a conditional access system according to the state of the art.

FIG. 1 shows a system for conditional access to digital content according to the state of the art. It consists of a broadcast network 4 implemented by an protected content broadcasting operator. Thus, control words c and contents C, respectively encrypted and encoded, are jointly transmitted from a content server 3 To that end, the server 3 encodes the plain text M of the content using an encoding function enc and a control word k, the latter being generated by said server 3. An encoded content C such that C=enc(k,M) is thus obtained. A cipher c of the control word k is also transmitted or broadcast together with the encoded content C. To that end, the server uses an encryption function E to encrypt said control word k to obtain c such that c=E(k).

The encrypted control words c and the encrypted content C are transmitted, via the broadcast network 4, to terminals 2a to 2m. The latter are respectively responsible for the real-time decoding of the encoded content C transmitted by the server 3. Thus, a terminal—for example such as the decoder 2a—implements a decoding function dec and applies it to the encoded content C to obtain the plain text M of the content. The latter can be viewed by using a home television set 5 or any other suitable interface for rendering the plain text of the content. To apply the decoding function dec, a terminal must know the value of the control word k that was used by the server 3 to encode the content M. According to the state of the art, and in accordance with FIG. 1, a terminal 2a to 2m receives an encrypted control word c such that c=E(k) and transmits it to a secure electronic device 1a to 1m, generally dedicated to a subscriber. The terminal 2a regularly receives pairs (C,c) through the network 4 and transmits the encrypted control words c to a device 1a. The device 1a can decrypt an encrypted control word c using a decryption function D to obtain the control word k that was used to encode content M. Thus, k=D(c). The same is true for any other terminal, such as 2b to 2m, each respectively cooperating with a device 1b to 1m. According to one alternative embodiment, the server 3 can use a secret, for example in the form of a key Kc, to encrypt a control word k. Thus, c=E(Kc,k). In that case, a device, such as the device 1a to 1m, uses a reciprocal decryption function D, such that k=D(Kd,k), where Kd is a decryption key known by the device. According to the encryption E and decryption D functions, the keys Kc and Kd can be identical. This is the case for a symmetrical encryption/decryption. Alternatively, according to a system called "broadcast encryption", Kc is a public or secret key dedicated to the operator and Kd is a secret key dedicated to the device and known by the operator. According to this alternative, several individual decryption keys thus exist, and each of the legally issued devices given to said operator's subscribers has such an individual decryption key.

Figure 2:
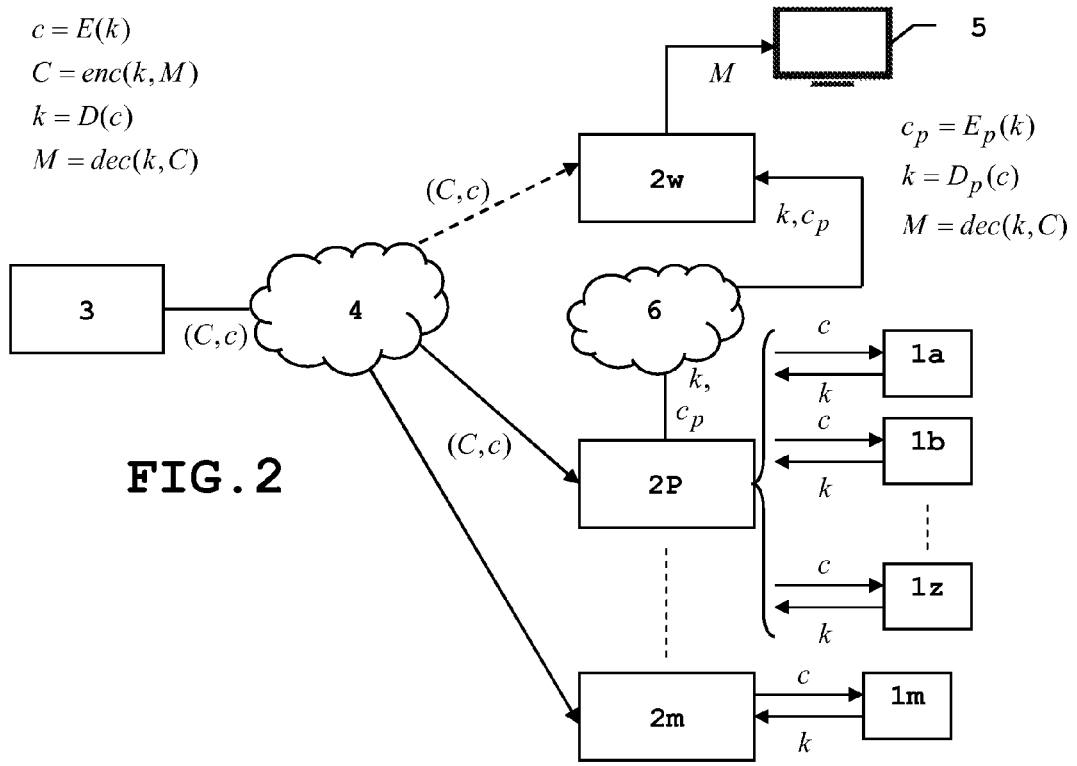
FIG. 2 shows a mode for hacking protected multimedia content broadcast using the conditional access system according to the state of the art.

FIG. 2 shows a scenario where a pirate organization, which we will call "hacker", manages to engage in a fraudulent trade of protected content.

According to this first scenario, the hacker has quite normally purchased a subscription from a content operator. He may thus have a subscriber electronic device, such as a smart card 1a. The hacker is further in possession of a terminal 2P called pirate terminal. This terminal can receive pairs (C,c) from a broadcast network like that described with respect to FIG. 1. The terminal 2P can cooperate with said device 1a to allow it to transmit the encrypted control words c. In return, the device 1a generates the control word k by decrypting the cipher c using a decryption function D. Quite normally, the device 1a delivers the control word k to the terminal 2P. According to this first scenario, the pirate terminal 2P can then emit the control words k in real-time through a hacker network 6. A dishonest user who "subscribed" a membership from the hacker may have a terminal 2w. The latter is adapted so that it receives encoded content C from the distribution network 4 (arrow in dotted lines), on the one hand, and the associated control words k, in plain text, from the pirate network 2, on the other hand. The terminal 2w can decode the encoded content C and deliver the plain text M of the content so that it can be rendered.

A hacker can also get multiple subscriptions from one or more operators. A pirate terminal 2P can cooperate with multiple subscriber devices 1a to 1z simultaneously and implement a more or less complex management algorithm for said devices. For example, the pirate terminal transmits a decrypted control word k primarily through the devices 1a to 1z. Alternatively, such a terminal 2P can randomly seek one electronic device or another, etc.

Alternatively, a hacker may optionally use a proprietary method to encrypt or encode the control words k transmitted on a pirate network. Thus, it is possible to transmit, on said pirate network, a cipher $c_p = E_p(k) - E_p$ being a proprietary encryption function of the hacker. A terminal 2w comprises, in this case, reciprocal decryption functions $D_p$ to deliver in fine the expected plain text of a content.

The invention allows thwarting these various pirate scenarios.

FIG. 3 shows a first embodiment of a conditional access system to digital content as provided by the invention. As for a known system, the invention provides a broadcast network 4 implemented by a protected content broadcast operator. Encoded contents C are emitted from a content server 3. To that end, the server 3 encodes the plain text M of the content using an encoding function enc. Encoded content C is thus obtained such that C=enc(M). A tag t is also emitted or broadcast together with the encoded content C. That tag contains, in particular, data relative to the current cryptoperiod. It may also contain data regarding the content or instructions the server wishes to emit over the network 4 to one or more subscriber devices 1a to 1m, respectively cooperating with terminals 2a to 2m capable of receiving the elements broadcast via the network 4. According to this first embodiment, a header H is also and jointly broadcast with the encoded content C and the tag t. This header will primarily be used by any terminal to decode encoded content.

The decoders 2a to 2m are respectively responsible for real-time decoding of the encoded content C emitted by the server 3. Thus, a terminal—for example such as the decoder 2a—implements a decoding function dec and applies it to the encoded content C to obtain the plain text M of the content.

The latter may be viewed using a home television set 5 or any other device suitable to render the plain text of the content. To apply the decoding function dec, a terminal must know the value of the header H as well as the value of a control word $k_{a,cp}$ generated and delivered by the secure subscriber electronic device 1a cooperating with the terminal 2a. The same is true for any other terminal, such as the terminals 2b to 2m, each cooperating respectively with the devices 1b to 1m. The control words $k_{i,cp}$ delivered by a subscriber device 1i are generated using tags t transmitted from the server 3 via the terminals, an identifier i dedicated to the subscriber device 1i and a secret $SK_i$, i and $SK_i$ being stored in the subscriber device 1i. Each control word is thus specific to a particular subscriber device. Thus, $k_{i,cp}$ is specific and dedicated to the device 1i. This control word $k_{i,cp}$ is also different from the other control words respectively dedicated to the other subscriber devices. To decode encoded content C, a terminal 2i thus implements a decoding function dec such that M= dec($k_{i,cp}$,C,H), M being the plaint text of the content.

According to one alternative embodiment illustrated relative to FIG. 3a, a server 3 may transmit only the encoded content C and the tag t characterizing the current cryptoperiod cp through the network 4 to terminals, including the terminal 2i. In this case, the generating of header H, necessary for decoding, is implemented by the subscriber device 1i cooperating with the terminal 2i—in a manner similar to that implemented by the server 3 described in connection to FIG. 3. This alternative allows reducing the bandwidth necessary to broadcast the encoded content.

Irrespective of the embodiment (described in connection with FIG. 3 or 3a), the invention allows implementing a conditional access system that prevents the risk of control-word sharing. Indeed, the control words used by the decoders to decode the encoded content are traceable. They, in fact, each and respectively, depend on a dedicated identifier of the subscriber device that generated and delivered them. Each control word thus generated is unique and dedicated to a subscriber device. For two subscriber devices 1i and 1j, two control words $k_{i,cp}$ and $k_{j,cp}$ are respectively generated by the devices 1i and 1j such that $k_{i,cp} \neq k_{j,cp}$. FIG. 4 shows a technique allowing an operator to detect the fraudulent use of a subscriber device that we will call "traitor device". FIG. 4 uses the same elements described with respect to FIG. 3. Thus, a pirate terminal 2P receives triplets (C,H,t) from a broadcast network 4. The terminal 2P cooperates with one or more legally acquired devices 1a to 1z according to the invention. They generate and deliver control words that in particular and respectively depend on the identifier of each subscriber device. Thus, a device 1a delivers a control word $k_{a,cp}$ that depends particularly on its dedicated identifier a. We will study below a method for generating such a control word (relative to FIGS. 5a and 5b). To illustrate the observation process, let us consider that it is possible for an operator in possession of a control word $k_{i,cp}$ to deduce the identifier i of the device having generated said control word $k_{i,cp}$.

The terminal 2P having received the control words $k_{a,cp}$, $k_{b,cp}$ or $k_{z,cp}$ respectively generated by the devices 2a, 2b, 2z can emit, in real-time through a pirate network 6, one or more control words—which we will denote $k_{p,cp}$—equal to one of the words $k_{a,cp}$, $k_{b,cp}$ or $k_{z,cp}$. A terminal 2w can receive, on the one hand, encoded content C (accompanied by the header H and the tag t) from the distribution network 4, and, on the other hand, control words $k_{p,cp}$ in plain text from the pirate network 6. The terminal 2w can decode the encoded content C and deliver the plain text M of the content so that it can be viewed. An operator can have means 9 to observe the hacker network 6. This observation may consist in perceiving one or more control words $k_{p,cp}$ that pass through the pirate network 6. Based on this observation, an operator manages to identify at least one traitor device used by a decoder or hacker terminal 2P from among the devices 1a to 1z.

As soon as a traitor device 1i is identified, it can be revoked by transmitting a revocation request as provided by the invention (FIG. 5b), and even by taking any measures he may deem useful in order to stop the use of the traitor device.

In an attempt to complicate the task of the operator seeking to trace a traitor device, the control word may alternatively result from a mixture based on one of said control words $k_{a,cp}$, $k_{b,cp}$ or $k_{z,cp}$ so as to generate and emit a $k_{p,cp}$ distinct from said $k_{a,cp}$, $k_{b,cp}$ or $k_{z,cp}$. However, the invention provides an embodiment to prevent the use of such combinations or mixtures so as to guarantee traceability of the subscriber devices.

As indicated in FIG. 9, and with respect to the alternative described in FIG. 3, in order to implement the invention, the plain text M of the content is encoded by a content server 3 using a function enc as described, for example, in connection with FIG. 7 according to a method 410. The latter further allows generating a tag t that characterizes, in particular, the current cryptoperiod cp. A header H is further generated by said server 3 (or by the subscriber devices according to the alternative of FIG. 3a). The triplets (C,H,t)—or the pairs (C,t) according to FIG. 3a—are transmitted from the server 3 via the network 4 to at least one terminal 2i that in turn transmits said tag t to a subscriber device 1i with which it cooperates. According to a method 100 as described in connection with FIG. 5a, the device 1i—adapted as indicated in FIG. 5—generates and delivers a control word $k_{i,cp}$ specific to said terminal 2i. The latter decodes the encoded content C using a decoding function dec according to a method such as the method 200 described as an example by FIG. 6. The plain text M of the content thus obtained can be delivered by a man-machine interface 5. Beforehand, such a conditional access method according to the invention comprises a step for defining and distributing a dedicated secret $SK_i$ to a group of subscriber devices. According to one particular embodiment, the secrets $SK_i$ have a shared value identical to that of a secret MK shared with the server. To initialize such a shared secret, the invention provides a method, such as the example 400 described in connection with FIG. 8.

The invention further provides that a plurality of subscriber devices can share a same identifier i. Such a plurality of devices is then comparable to a set of "clones" sharing a same identifier i or even a same $SK_i$. For simplification purposes, and within the meaning of the invention, the notion of "subscriber device" indifferently covers any subscriber device in an individual form (a single electronic device) or a plural form (multiple devices sharing the same identifier i).

According to a first preferred embodiment, the invention is based on the mathematical notion of coupling in prime order groups. Such coupling is a bilinear application generally used in cryptography, in particular in the field of elliptical curves.

Let β be a bilinear group β=(p, $G_1, G_2, G_T$ ,e(.,.)) of first order p such that |p|=λ, λ defining the size of the elements as a security parameter. $G_1$, $G_2$ and $G_T$ are three cyclical groups of order p and e: $G_1 \times G_2 \to G_T$ a coupling. A cyclical group is an algebraic set such that $g^{p+1}$ is equal to g, p defining the order of the cyclical group and g an element of the group that we will call "generator". Within the meaning of the invention, a particular relationship between the groups $G_1$ and $G_2$ is not required. The two groups can be identical or more generally, an isomorphism Ψ between $G_1$ and $G_2$ can be defined. The invention provides that any isomorphism as well as any effectively calculable coupling is favored.

The value $SK_i$ is common and shared between all of the subscriber devices. The value of $SK_i$ is equal to MK, and said secret $SK_i$=MK can then be generated as indicated as an example in FIG. 8. Thus, a method 400 for generating such a secret may consist of randomly choosing 402 a generator g from the group $G_1$ —as indicated by the notation $$g \xleftarrow{R} G_1.$$

In 403, such a method also and randomly chooses $\gamma_0$ belonging to the set $Z_p$ of integers modulo p. The secret MK can then be defined 404 as a set of two components respectively equal to g and $\gamma_0$—we will use the notation MK=(g,$\gamma_0$) to describe this. This method 400 can be implemented by a content server such as the server 3 described in connection with FIGS. 3 and 3a or alternatively by a dedicated server, the secret MK then being transmitted to said content server, which thus knows the secret previously generated.

The processing means of a server 3 like that described in connection with FIGS. 3 and 3a can then use a method to encode the plain text M of the content and generate encoded content C. Such a method may be according to the example of the method 410 described in connection with FIG. 7.

Said method thus comprises a step 414 for generating encoded content C from a cryptoperiod cp and the secret MK stored by the server 3.

It further comprises a step (not shown) for generating a tag t so as to characterize the cryptoperiod cp from which the encoded content C was generated. Lastly, it comprises a step (not shown) for jointly delivering said encoded content C and said tag t. Such a method may further include a step prior to transmission of the tag t to associate the latter with data attesting to its integrity.

According to this first preferred embodiment of the invention, the function enc for generating the encoded content C consists first of calculating 411 $\gamma_{cp}$=$F_0$($\gamma_0$,cp), $F_0$ being a determined and known function of the server 3. The server 3 chooses 412 a set s={$s_j$}$_{j=1}^n$ of n values each belonging to $Z_p$.

It calculates 413 a word K={$K_j$}$_{j=1}^n$ whereof the n components are each equal to $$K_j = e(g, f)^{\frac{1}{\gamma_{cp}+s_j}},$$

for any j comprised between 1 and n, the generator f being a generator randomly chosen from the group $G_2$, for example in step 402 of the method according to FIG. 8—as indicated by the notation $$f \xleftarrow{R} G_2.$$

The server 414 applies a function $F3^{-1}$ to said word K and to the plain text M of the content to generate the encoded content C. According to one exemplary embodiment, the function $F3^{-1}$ is the exclusive OR. The components of the word K are concatenated or mixed beforehand in a determined manner.

The method described in connection with FIG. 7 can further include a step 413a for generating the header H to enable decoding of the encoded content. This alternative is implemented by a server 3 as described in connection with FIG. 3, which delivers the header H together with the encoded content C and the tag t.

According to this embodiment, the header H can consist of a set H={$h_j$}$_{j=1}^n$ of n components respectively equal to a pair of magnitudes $$\left( f^{\frac{1}{\gamma_{cp}+s_j}}, s_j \right)$$

for any j comprised between 1 and n. The set s={$s_j$}$_{j=1}^n$ of n values is identical to the set s used to generate the word K and f is the generator chosen—possibly randomly—from among the group $G_2$ during the step 402 for generating the secret MK.

To implement the invention, it is further necessary to adapt the subscriber electronic devices. Thus, figure describes a subscriber device according to the invention. Such a device 1i comprises means R for receiving a tag t from the outside world—for example from a terminal 2i.

According to one embodiment of the invention, a tag t may include data attesting to its integrity. As an example, said data may consist of a redundancy code such as a hash or be generated using a secret Kd shared between the device and the server. According to one alternative, such a tag may be transmitted encrypted from the server after having been generated by the latter using an asymmetrical or symmetrical encryption algorithm. According to these two embodiments, the device 1i comprises processing means 10 that can verify 11 the integrity of the received tag, or even decrypts it. If a secret Kd is necessary for that usage, storage means 21 may be provided within a device 1i according to the invention to store said secret and cooperate with said processing means. To generate 13 a control word $k_{i,cp}$ specific to the device 1i, the processing means 10 cooperate with means 22 for storing an identifier dedicated to the device. To generate the control word, the processing means 10 are capable of deducing 12 the current cryptoperiod cp from the tag. They further cooperate with storage means 23 that store a secret $SK_i$. From the identifier i, the cryptoperiod cp and the secret $SK_i$, the processing means of the device generate 13 the control word $k_{i,cp}$. The latter is delivered by the device 1i to the outside world (for example, to the terminal 2i) via means for delivering S.

To generate a control word, the processing means of a device 1i according to the invention can implement a method 100 as illustrated by FIG. 5a.

Such a method for generating a control word comprises a first step for receiving 101 a tag t via the receiving means R of the device 1i. It further comprises a step for determining 103 the current cryptoperiod cp by using the received tag t, then a step for generating 105 a control word $k_{i,cp}$ from said current cryptoperiod cp, the identifier i dedicated to the device and the secret $SK_i$–i and $SK_i$ being stored by the device. The method further comprises a step for delivering a control word k' equal to $k_{i,cp}$ via the delivering means S of the device.

According to the first preferred embodiment based on the bilinear group $\beta$=(p, $G_1$,$G_2$,$G_T$ ,e(.,.)) of prime order p, a subscriber device, implementing a method 100 as illustrated in connection with FIG. 5a, receives 101 a tag t—optionally validates 102 its integrity—then deduces 103 the current cryptoperiod cp. In 104, said device implements a function F0 (identical to that implemented by the content server) which, applied to the component $\gamma_0$ of the secret $SK_i$=MK and the cryptoperiod cp, allows generating $\gamma_{cp}$ which belongs to $Z_p$.

The method 100 then comprises a step 105 for generating the control word $k_{i,cp}$. This step consists of calculating a pair of magnitudes $x_{i,cp}$ and $A_{i,cp}$. $x_{i,cp}$ belongs to $\mathbb{Z}_p$ and is calculated by the processing means of the device deterministically from the identifier i and the cryptoperiod cp. $A_{i,cp}$ is calculated by the device as being equal to $$g^{\frac{1}{\gamma_{cp}+x_{i,cp}}}.$$

The device 1i implementing a method 100 can then deliver 106 a control word k' equal to $k_{i,cp}$ to the outside world (such as a terminal 2i with which it cooperates).

The invention provides that, according to the alternative described in connection with FIG. 3a, a subscriber device according to the invention can—instead and in place of the content server 3—create and generate the header H. The method 100 then comprises a step 105a for generating the components of said header and a step 106a for delivering said header to the terminal with which it cooperates. This step 105a is similar to the step 413a previously described and implemented by a server 3 according to FIGS. 3 and 7.

Thus, the step 105a implemented by a subscriber device, as described in connection with FIG. 3a, can consist of calculating a set $H=\{h_j\}_{j=1}^n$ of n components respectively equal to a pair of magnitudes $$\left(f^{\frac{1}{\gamma_{cp}+s_j}}, s_j\right)$$

for any j comprised between 1 and n. To determine the set $s=\{s_j\}_{j=1}^n$ of n values identical to the set s used to generate the word K by the server 3 (step 413 of FIG. 7) and to choose the generator f from among the group $G_2$ (during the step 402 in conjunction with the creation of the secret MK), the invention provides that the tag t comprise data characterizing said choices. Alternatively, said set $s=\{s_j\}_{j=1}^n$ and generator f are predetermined and shared between the server and the set of subscriber devices.

To decode encoded content C, the processing means of a terminal 2i as shown in connection with FIG. 3 or 3a cooperate with means for storing the parameters of the bilinear group β. They use a decoding function dec—like that described in connection with FIG. 6—to generate the plain text M of the content.

Such a method 200 is implemented by the processing means of the terminal following the reception of encoded content C, a header H and a control word $k_{i,cp}$ from the outside world. It comprises a step for applying 201 a first function F1 to the header H and to the control word $k_{i,cp}$ to generate 203 a word K. The method 200 further comprises a step for applying 204 a second function F3 to said word K and the encoded content C to generate the plain text M of the content. According to this embodiment, the function $F3^{-1}$, used by the server to include the content, is an inverse function of the function F3. The terminal can thus deliver 205 said plain text M of the content. According to one embodiment, said processing means of the terminal can use an extension function F2 to adapt the format of the word K before application of the function F3.

Thus, according to the first preferred embodiment of the invention based on a bilinear group $β=(p, G_1, G_2, G_T, e(.,.))$ of prime order p, we recall that the control word $k_{i,cp}$ comprises two components $x_{i,cp}$ and $A_{i,cp}$, $x_{i,cp}$ having been calculated directly from the identifier i of the subscriber device that generated and delivered said control word. We further recall that the header H consists of a set of components $h_j$ respectively equal to $$\left(f^{\frac{1}{\gamma_{cp}+s_j}}, s_j\right)$$

for any j comprised between 1 and n. The step 203 for generating the word K then consists of using a bilinear application e: $G_1 \times G_2 \to G_T$ for which $G_1$, $G_2$ and $G_T$ are three cyclical groups of prime order p. This bilinear application pertains to the components of H and $k_{i,cp}$ such that $$K_j = e\left(A_{i,cp}, \left(f^{\frac{1}{\gamma_{cp}+s_j}}\right)^{x_{i,cp}-s_j} \cdot f\right)$$

for any j=1 at n, f being the generator belonging to the cyclical group $G_2$ of order p.

By using the bilinearity property, $$K_j = e\left(A_{i,cp}, \left(f^{\frac{1}{\gamma_{cp}+s_j}}\right)^{x_{i,cp}-s_j} \cdot f\right) = e(g, f)^{\frac{1}{\gamma_{cp}+s_j}}.$$

We can see that this property allows to eliminate the contribution of the magnitude $x_{i,cp}$ that depends directly on the identifier i dedicated to the subscriber device 1i that generated and delivered the control word $k_{i,cp}$.

To generate the plain text M of the content, the step 204 for applying the function F3 to said components of the word K and to the encoded content C consists of applying the function F3 to the components previously aggregated 203—concatenated or mixed in a manner similar to the aggregation done in step 414 during encoding of the content by the server. As an example, the function F3 can consist of the exclusive OR—the functions F3 and $F3^{-1}$ then being identical.

The optional implementation of the expansion function F2—step 202—may consist, according to the preferred exemplary embodiment of the invention, of adapting the size of the outputs of each application of the function F1 to a component $K_j$ to make it compatible with the application of the function F3 between the aggregation of said components $K_j^*$ thus adapted by F2 and the encoded content C.

The invention provides a second preferred embodiment also based on the mathematical notion of coupling in groups of prime order. According to this second embodiment, the value of the secret $SK_i$ stored in each subscriber device is distinct and depends in particular on the value of the identifier i thereof.

Let β be a bilinear group $β=(p, G_1, G_2, G_T, e(.,.))$ of prime order p such that $|p|=λ$, λ defining the size of the elements as security parameter. $G_1$, $G_2$ and $G_T$ are three cyclical groups of order p and e: $G_1 \times G_2 \to G_T$ a coupling. A particular relationship between the groups $G_1$ and $G_2$ is not required. The two groups may be identical or, more generally, an isomorphism Ψ between $G_1$ and $G_2$ may be defined. The invention provides that any isomorphism as well as any effectively calculable coupling are favored.

The value of the secret MK known by the server may consist of randomly choosing two generators g and f respectively from the groups $G_1$ and $G_2$—as indicated by the notations $$g \xleftarrow{R} \mathbb{G}_1$$

and $$f \xleftarrow{R} \mathbb{G}_2.$$

Furthermore, γ will randomly be chosen belonging to the set $\mathbb{Z}_p$ of integers modulo p. The secret MK can then be defined as a set of three components respectively equal to g, γ and f—we will use the notation MK=(g,γ,f) to describe this.

To generate a pair of secrets $SK_i$ and $DK_i$ intended to be respectively stored in the subscriber device 1*i* and in the terminal 2*i* cooperating with the latter, the server 3 can use the following method. $x_i$ is chosen belonging to $\mathbb{Z}_p$ and the magnitude $$B_i = f^{\frac{1}{\gamma + x_i}}$$

is calculated. A secret $SK_i$ may be defined as a set of two components respectively equal to $x_i$ and $B_i$—we will use the notation $SK_i=(x_i,B_i)$ to describe this. A secret $DK_i$ is defined as being equal to $$DK_i = g^{\frac{x_i}{\gamma + x_i}}.$$

The processing means of the server 3, like that described in connection with FIGS. 3 and 3*a*, can then implement a method to encode the plain text M of the content and generate encoded content C.

Such a method may include a step for generating encoded content C from a cryptoperiod cp and the secret MK known or stored by the server 3.

For a cryptoperiod cp, such a method further comprises a step for generating a tag $t=t_{cp}$ so as to characterize the cryptoperiod cp from which the encoded content C was generated. As an example, and according to the second preferred embodiment, said step for generating $t=t_{cp}$ consists of choosing—possibly randomly—$y_{cp}$ among the set $\mathbb{Z}_p$ and generating a magnitude $$f_{cp} = f^{\frac{1}{\gamma + y_{cp}}}.$$

The tag $t=t_{cp}$ consists of a pair of two magnitudes respectively equal to $y_{cp}$ and $f_{cp}^{-1}$, such that $t=t_{cp}=(y_{cp},f_{cp}^{-1})$. Such a method may further include a step prior to the transmission of the tag t to associate data attesting to its integrity therewith.

The function enc to generate the encoded content C consists of first choosing—optionally randomly—a set $s=\{s_j\}_{j=1}^n$ of n values each belonging to $\mathbb{Z}_p$. A word $K=\{K_j\}_{j=1}^n$ is then calculated whereof the n components are respectively equal to $K_j=e(g, f_{cp})^{s_j}$ for any j comprised between 1 and n.

The server applies a function F3$^{-1}$ to said word K and to the plain text M of the content to generate the encoded content C. According to one exemplary embodiment, the function F3$^{-1}$ is the exclusive OR. The components of the word K are previously concatenated or mixed in a determined manner.

The method used by the server may further include a step for generating the header H to allow in fine the decoding of the encoded content by a terminal. This alternative is implemented by a server 3 as described in connection with FIG. 3, which delivers the header H together with the encoded content C and the tag t.

According to this embodiment, the header H may consist of a set $H=\{h_j\}_{j=1}^n$ of n components respectively equal to a pair of magnitudes $(h_{j,1}, h_{j,2})$. For any j comprised between 1 and n, $h_{j,1}=g^{s_j\gamma}$ and $h_{j,2}=f_{cp}^{s_j}$, the set $s=\{s_j\}_{j=1}^n$ of n values being identical to the set used to generate the word K.

To implement the invention according to this second preferred embodiment, it is further necessary to adapt the subscriber electronic devices. Such a device 1*i*—as described in connection with FIG. 5—comprises means 23 for storing the value of the secret $SK_i$ as generated by the server. It further comprises means 13 for generating a control word $k_{i,cp}$ in accordance with the method which, for example, comprises a first step for receiving a tag t via the receiving means R of the device 1*i*. It further comprises a step for determining the current cryptoperiod cp by using said received tag $t=t_{cp}$, then a step for generating a control word $k_{i,cp}$ from said current cryptoperiod cp, the identifier i dedicated to the device and the secret $SK_i$–i and $SK_i$ being stored by the device. The method also comprises a step for delivering a control word k' equal to $k_{i,cp}$ via the delivering means S of the device.

According to the second preferred embodiment based on the bilinear group $\beta=(p, \mathbb{G}_1, \mathbb{G}_2, \mathbb{G}_T, e(.,.))$ of prime order p, a subscriber device 1*i* comprises a secret $SK_i=(x_i,B_i)$. The received tag $t=t_{cp}$ is equal to $t=t_{cp}=(y_{cp},f_{cp}^{-1})$, cp being the current cryptoperiod.

One method for generating $k_{i,cp}$ consists of calculating $$k_{i,cp} = (B_i \cdot f_{cp}^{-1})^{\frac{1}{y_{cp}-x_i}}$$

$$= \left(f^{\frac{1}{\gamma+x_i}} \cdot f^{\frac{-1}{\gamma+y_{cp}}}\right)^{\frac{1}{y_{cp}-x_i}}$$

$$= f_{cp}^{\frac{1}{(\gamma+y_{cp})(\gamma+x_i)}}$$

$$= f_{cp}^{\frac{1}{(\gamma+x_i)}}.$$

The device 1*i* implementing such a method can then deliver a control word k' equal to $k_{i,cp}$ to the outside world (such as a terminal 2*i* with which it cooperates).

The invention provides that, according to the alternative described in connection with FIG. 3*a*, a subscriber device according to the invention can—instead and in place of the content server 3—create and generate the header H as previously defined.

To decode encoded content C, the processing means of a terminal 2*i*, as shown in connection with FIG. 3 or 3*a*, implement a decoding function dec to generate the plain text M of the content. Such a decoder 2*i* further comprises means for storing the value of the secret $DK_i$ generated by the server as well as the parameters of the bilinear group β.

One method implemented by the processing means of the terminal following reception from the outside world of encoded content C, a header H and control word $k_{i,cp}$ comprises a first step for generating a word $K=\{K_j\}_{j=1}^n$. According to the second preferred embodiment, we recall that the header H generated by the server or, alternatively, by the subscriber device, consists of a set $H=\{h_j\}_{j=1}^n$ of n components respectively equal to a pair of magnitudes $(h_{j,1}, h_{j,2})$.

Thus, the step for generating the word K consists, for any j comprised between 1 and n, of generating $$K_j = e(DK_i, h_{j,2}) \cdot e(h_{j,1}, k_{i,cp})$$

$$= e\left(g^{\frac{x_i}{\gamma+x_i}}, f_{cp}^{s_j}\right) \cdot e\left(g^{s_j \cdot \gamma}, f_{cp}^{\frac{1}{(\gamma+x_i)}}\right), \text{ or}$$

$$K_j = e(g, f_{cp})^{\frac{s_j \cdot x_i}{\gamma+x_i}} \cdot e(g, f_{cp})^{\frac{s_j \cdot \gamma}{\gamma+x_i}}$$

$$= e(g, f_{cp})^{s_j}.$$

We can see that the contribution of the magnitude $x_i$—which directly depends on the identifier i dedicated to the subscriber device $1i$ that generated and delivered the control word $k_{i,cp}$—is eliminated.

To generate the plain text M of the content, the method further comprises a step for applying a function F3 to the word K and the encoded content C. This amounts to applying the function F3 to the components of the word $K=\{K_j\}_{j=1}^n$ previously aggregated—concatenated or mixed similarly to the aggregation done during encoding of the content by the server. As an example, the function F3 may consist of the exclusive OR, the functions F3 and $F3^{-1}$ then being identical.

In connection with FIG. 4, to prevent the use of a control word $k_{p,cp}$—transmitted by a hacker—resulting from a mixture based on one of the control words $k_{a,cp}$, $k_{b,cp}$ or $k_{z,cp}$, the invention provides a third preferred embodiment that is also based on a mathematical notion of coupling in groups of prime order.

Let $\beta$ be a bilinear group $\beta=(p, G_1, G_2, G_T, e(.,.))$ of prime order p such that $|p|=\lambda$, $\lambda$ defining the size of the elements as security parameter. $G_1$, $G_2$ and $G_T$ are three cyclical groups of order p and e: $G_1 \times G_2 \to G_T$ a coupling. A particular relationship between the groups $G_1$ and $G_2$ is not required. The two groups may be identical or, more generally, an isomorphism $\Psi$ between $G_1$ and $G_2$ may be defined. The invention provides that any isomorphism as well as any effectively calculable coupling are favored. According to this third embodiment, a parameter T is also defined that determines the maximum size of an authorized coalition.

As for the first preferred embodiment, each subscriber device stores a secret whereof the value $SK_i=MK$ is common and shared between a group of subscriber devices and is known to the content server.

The value of said secret MK may consist of choosing, possibly randomly, a generator $g_0$ of the group $G_1$. Furthermore, $\gamma$ is chosen—possibly randomly—belonging to the set $Z_p$ of integers modulo p. The secret MK can then be defined as a set of two components respectively equal to $g_0$ and $\gamma$—we will use the notation $MK=(g_0,\gamma)$ to describe this.

The processing means of a server 3, as described in connection with FIGS. 3 and 3a, can then implement a method for encoding the plain text M of the content and generating encoded content C from a cryptoperiod cp and the secret MK known or stored by the server 3.

For a cryptoperiod cp, such a method comprises a first step for generating a tag $t=t_{cp}$ so as to characterize the cryptoperiod cp from which the encoded content C will be generated. Such a method may further include a step prior to the transmission of the tag t to associate the latter with data attesting to its integrity.

To generate content C, the method comprises a step for applying a function $F_0$ to the generator $g_0$ and the cryptoperiod cp to generate $g_{cp}=F_0(g_0,cp)$ belonging to the group $G_1$. It further comprises a step for choosing—optionally randomly—

$$r = \{r_{j,l}\}_{\substack{j=1 \\ l=1}}^{\substack{j=n \\ l=T}}$$

and $s=\{s_j\}_{j=1}^n$ two sets of elements of $Z_p$.

It comprises a step for calculating a word $K=\{K_j\}_{j=1}^n$ whereof the n components are respectively equal to $$K_j = e(g_{cp}, f)^{\frac{s_j}{(\gamma+r_{j,1}) \ldots (\gamma+r_{j,T})}}$$

for any j comprised between 1 and n, f being a generator of $G_2$.

The server applies a function $F3^{-1}$ to said word K and to the plain text M of the content to generate the encoded content C. According to one exemplary embodiment, the function $F3^{-1}$ is the exclusive OR. The components of the word K are concatenated or mixed in a determined manner beforehand.

The method implemented by the server may further include a step for generating a header H to allow in fine decoding of the encoded content by a terminal. This alternative is implemented by a server 3 like that described in connection with FIG. 3, which delivers the header H together with the encoded content C and the tag t.

According to this embodiment, the header H may consist of a set $H=\{h_j\}_{j=1}^n$ of n components respectively equal to a quadruplet of magnitudes $(\{P_l\}_{l=1}^T, \{r_{j,l}\}_{l=1}^T, g_{cp}^{\gamma \cdot s_j}, P_T^{s_j})$. For any j comprised between 1 and n, $$P_1 = f^{\frac{1}{\gamma+r_{j,1}}}, P_2 = f^{\frac{1}{(\gamma+r_{j,1})(\gamma+r_{j,2})}}, \ldots P_T = f^{\frac{1}{(\gamma+r_{j,1})(\gamma+r_{j,T})}},$$

the set $$r = \{r_{j,l}\}_{\substack{j=1 \\ l=1}}^{\substack{j=n \\ l=T}}$$

being identical to the set r used to generate the word K. The set s, the generators $g_{cp}$ and f as well as T are also identical to the elements used to generate the word K.

To implement the invention according to this third preferred embodiment, it is further necessary to adapt the subscriber electronic devices. Such a device $1i$—as described in connection with FIG. 5—comprises means for storing the value of the secret $SK_i=MK$ generated by the server or simply known by it. It further comprises means 13 for generating a control word $k_{i,cp}$ according to a method which, for example, comprises a first step for receiving a tag t via the receiving means R of the device $1i$. It further comprises a step for determining the current cryptoperiod cp by using the received tag $t=t_{cp}$, then a step for generating a control word $k_{i,cp}$ from said current cryptoperiod cp, the identifier i dedicated to the device and the secret $SK_i$—i and $SK_i$ being stored by the subscriber device. The method also comprises a step for delivering a control word k' equal to $k_{i,cp}$ via the delivering means S of the device.

According to this third preferred embodiment based on the bilinear group $\beta=(p, G_1, G_2, G_T, e(.,.))$ of prime order p, a subscriber device 1*i* comprises a secret $SK_i=MK=(g_0,\gamma)$. The received tag $t=t_{cp}$ allows characterizing and therefore deducing the current cryptoperiod cp.

A method for generating $k_{i,cp}$ first consists of generating $g_{cp}$ by applying a function $F_0$—identical to the function used by the server—to $g_0$ and cp such that $g_{cp}=F_0(g_0,cp)$.

Furthermore, said method comprises a step for generating, deterministically and in a manner known by the server, a magnitude $x_{i,cp}$, element of $\mathbf{Z}_p$, that depends on the identifier i of the device and the current cryptoperiod cp. Alternatively, $x_{i,cp}=x_i$ is calculated to depend on the identifier i but not cp. The step for generating the traceable control word $k'=k_{i,cp}$ consists of generating a triplet $k_{i,cp}=(x_{i,cp},A_{i,cp},B_{i,cp})$ for which $$A_{i,cp} = g_{cp}^{\frac{x_{i,cp}}{\gamma+x_{i,cp}}} \text{ and } B_{i,cp} = f^{\frac{1}{\gamma+x_{i,cp}}}.$$

The device 1*i* implementing such a method can then deliver a control word k' equal to $k_{i,cp}$ to the outside world (such as a terminal 2*i* with which it cooperates).

The invention provides that, according to the alternative described in connection with FIG. 3*a*, a subscriber device according to the invention can—instead and in place of the content server 3—generate and generate the header H as previously defined.

To decode encoded content C, the processing means of a terminal 2*i*, as shown in connection with FIGS. 3 or 3*a*, implement a function dec to generate the plain text M of the content. Such a decoder 2*i* further comprises means for storing the parameters of the bilinear group β.

A method implemented by the processing means of the terminal following reception from the outside world of encoded content C, a header H and a control word $k_{i,cp}$ comprises a first step for generating a word $K=\{K_j\}_{j=1}^n$. According to this third preferred embodiment, we recall that the header H generated by the server or, alternatively, by the subscriber device, consists of a set $H=\{h_j\}_{j=1}^n$ of n components respectively equal to a quadruplet of magnitudes $(\{P_l\}_{l=1}^T, \{r_{j,l}\}_{l=1}^T, g_{cp}^{\gamma \cdot s_j}, P_T^{s_j})$. For any j comprised between 1 and n, $$P_1 = f^{\frac{1}{\gamma+r_{j,1}}}, P_2 = f^{\frac{1}{(\gamma+r_{j,1})(\gamma+r_{j,2})}}, \ldots P_T = f^{\frac{1}{(\gamma+r_{j,1})(\gamma+r_{j,T})}},$$

the set $$r = \{r_{j,l}\}_{j=1, l=1}^{j=n, l=T}$$

belonging to $\mathbf{Z}_p$. We further recall that the control word $k_{i,cp}$ consists of a triplet $k_{i,cp}=(x_{i,cp},A_{i,cp},B_{i,cp})$ for which $$A_{i,cp} = g_{cp}^{\frac{x_{i,cp}}{\gamma+x_{i,cp}}}$$

and $$B_{i,cp} = f^{\frac{1}{\gamma+x_{i,cp}}}.$$

Thus, the step for generating the word K consists, for any j comprised between 1 and n, of generating $$k_j = e\left(g_{cp}^{\gamma \cdot s_j}, B_{i,cp}^{\frac{1}{\prod_{l=1}^{T}(\gamma+r_{j,l})}}\right) \cdot e(A_{i,cp} = P_T^{s_j}), \text{ i.e.:}$$

$$K_j = e(g_{cp},f) \frac{s_j \cdot \gamma}{(\gamma+x_{i,cp})\prod_{l=1}^{T}(\gamma+r_{j,l})} \cdot$$

$$e(g_{cp},f) \frac{s_j \cdot x_{i,cp}}{(\gamma+x_{i,cp})\prod_{l=1}^{T}(\gamma+r_{j,l})}$$

$$= e(g_{cp},f) \frac{s_j}{\prod_{l=1}^{T}(\gamma+r_{j,l})}$$

with $$B_{i,cp}^{\frac{1}{\prod_{l=1}^{T}(\gamma+r_{j,l})}} = \left(B_{i,cp} \cdot \prod_{l=1}^{T} P_l^{(-1)^{i+T \cdot \prod_{m=1}^{l-1}(x_{i,cp}-r_{j,m})}}\right)^{\frac{1}{\prod_{l=1}^{T}(x_{i,cp}-r_{j,l})}}.$$

We can see that the contribution of the magnitude $x_{i,cp}$—which depends directly on the identifier i 10 dedicated to the subscriber device 1*i* that generated and delivered the control word $k_{i,cp}$—no longer appears in the word K.

To generate the plain text M of the content, the method further comprises a step for applying a function F3 to the word K and the encoded content C. This amounts to applying the function F3 to the components of the word $K=\{K_j\}_{j=1}^n$ previously aggregated—concatenated or mixed similarly to the aggregation done during the encoding of the content by the server. As an example, the function F3 may consist of the exclusive OR—the functions F3 and F3$^{-1}$ then being identical.

According to one alternative, for a given j, the elements $\{r_{j,l}\}_{l=1}^T$ can be calculated deterministically from a seed, such that only that seed is transmitted in the component $h_j$ of the header H. Said component then has a constant size independent of T. This parameter T may be adapted to the desired security level and effectiveness of the system.

Whether one chooses one of the three preferred embodiments described above, or more generally an embodiment according to the invention, the conditional access system thus formed uses traceable control words $k_{i,cp}$, which are therefore detectable by an operator. Such a system thereby avoids any risk of control-word sharing.

To illustrate a method making it possible to trace a control word $k_{i,cp}$ generated according to the invention—even when the control word $k_{p,cp}$ exchanged by the hacker is a mixed word or the result of a combination of several control words $k_{a,cp}$, $k_{b,cp}$ or $k_{z,cp}$—consider the scenario where a hacker delivers a utility or decryption program to a dishonest "subscriber" accompanied by a mixed control word emitted by a pirate network. Thanks to the invention, it is possible to find the identity of at least one of the legitimate (or traitor) devices used to create said mixed control word. This ability, called "traceability", can be achieved using a general method called "white box tracing".

According to this method, the pirate decoder is first interpreted as a sequence of formal instructions, each instruction being made up of an operation, one or more input variables and an output variable. Among the possible operations, a distinction is made between operations associated with the bilinear system $(p, \mathbf{G}_1, \mathbf{G}_2, \mathbf{G}_T)$, i.e., multiplication and exponentiation operations in each of the groups ($G_1, G_2, G_T$), and the bilinear coupling operation. These operations are called "algebraic", while the others are all described as "related" operations. In this same interpretation phase, the input and output variables of each instruction are put in a form called "SA" (Static Single-Assignment), so as to be able to deduce a graph easily from this representation of the pirate decoder for calculating any variable manipulated by it during its formal execution. The output variable of the program represents the data in plain text K and is the result of an output value calculation graph in $G_T$. The program is limited to the calculation of this graph.

In a second step called "specialization", an effort is made to set all of the input variables of the program to constant values for which the program can perform an accurate decryption. The search for set values may be conducted randomly and exhaustively and, if the decoder originally provided is functional enough (i.e., decrypts in a significant portion of cases on average), this search step may succeed quickly after several tests. When the values are suitable, they are substituted for the corresponding variables in the program, such that the new obtained program is made up solely of instructions implemented on constants. A simplification step of the program is then implemented in order to obtain a single sequence of instructions without jumps.

To that end, a propagation of the constants is done to eliminate all related instructions whereof the input variables are all constants; this transformation therefore excludes algebraic operations. At the end of this phase, the non-conditional jumps are eliminated by juxtaposing the linear sequences of instructions end to end in chronological order of execution. The program then becomes a series of sequential algebraic constructions without a control flow.

In a third phase, several algebraic simplification transformations are applied to the obtained program inductively and concurrently until the program is stabilized. These transformations aim to obtain an equivalent program in which the output K is calculated as a product of whole coupling powers from the input data, said powers being constant values due to the previous transformation phases. The exponent is then identified corresponding to each algebraic element of the figure provided as input as well as each element of the mixed control word provided as input. Due to the mathematical properties of the invention, this set of exponents, the values of which are known, forms a system of multivariate equations known in advance, the variables of which are the elements $x_1, x_2, \ldots, x_z \in \mathbb{Z}_p$ making up the control words used to generate the mixed control word on the one hand, and the chosen parameters $s_1, s_2, \ldots, s_z \in \mathbb{Z}_p$ making up the cipher C provided as input by the tracer on the other hand. The system of multivariate equations depends on the embodiment of the invention. Knowing the numerical value of the outputs of the system and the chosen parameters $\{s_j\}_{j=1}^z$, the system can be partially or totally inverted to find at least one of the elements $x_1, x_2, \ldots, x_z$ making up one of the original control words and thus to completely identify one of the traitor devices. This phase may require having $z \leq B$, where B is a bound that depends on the embodiment of the invention.

The invention also provides an embodiment for allowing or forbidding a subscriber electronic device—according to the invention—to generate a control word $k'=k_{i,cp}$. The invention thus provides that such a device can only be authorized to generate $k'=k_{i,cp}$ if a provision date or initialization date is before the current cryptoperiod. Thus and as an example, during the obtainment of a subscription, an initialization date $cp^b$ may be stored in the subscriber device delivered to a new subscriber. According to this embodiment, a subscriber device according to the invention comprises means 24 for storing such a date. This date may be expressed as being equal to the current cryptoperiod upon subscription. Thus, the processing means 10 of such a device may be adapted to cooperate with said means 24 and only deliver a control word $k'=k_{i,cp}$ if the current cryptoperiod cp is greater than or equal to $cp^b$. This embodiment is illustrated by FIGS. 5 and 5b. According to the latter figure, the method 100, implemented by the processing means 10 of a subscriber device, comprises a step 109 provided to that end. In FIG. 5, a device 1 comprises means 14 and 15 for comparing $cp^b$ and cp and requesting A the respective delivery $k'=k_{i,cp}$ or $k'=kf$, kf being a value distinct from a valid value of a control word $k_{i,cp}$. According to these same figures, the invention provides that one or more values kf may be stored by the device 1—storage means 26. The means S deliver 106b a control word $k'=kf$ instead and in place of $k'=k_{i,cp}$ if $cp^b$ is greater than the current cryptoperiod cp. This embodiment thus prevents any use of a subscriber device to decode encoded content received before the subscription. The invention provides, additionally or alternatively, the use of an expiration date $cp^e$ that can be stored in any subscriber device according to the invention. This date is recorded in means 25 of such a device upon the desired or forced termination of a subscription. Thus, a method 100, described in connection with FIG. 5b, can include a step 109 making it possible to compare the current cryptoperiod cp deduced from the tag and only deliver 106 $k'=k_{i,cp}$ if that cryptoperiod is less than $cp^e$. Otherwise, the control word delivered 106b by the device may be equal to kf as during the processing of the initialization date.

This embodiment may optionally be used to revoke a traitor device by using the network 4 to transmit a targeted revocation request and thwart the use of said traitor device.

According to this embodiment, the content server generates a tag $t=u\|v\|cp$ that comprises, aside from data relative to the current cryptoperiod cp, components u and v with determined values.

The component u allows indicating a revocation request to a device whereof the value of the identifier i is contained in the component v. Upon receiving a tag $t=u\|v\|cp$, the values u, v and cp are extracted by the means 12 of the device 1i according to FIG. 5. In connection with FIG. 5b, the means 14 compare 107 the value of the component u with a predetermined value $u_r$. If $u=u_r$ and $v=i$ (step 110), the processing means of the device initialize 111 an expiration date $cp^e$ equal to cp. The subscriber device is no longer able to deliver valid control words. If the value of v is different from the value of the identifier i of the device, the latter continues traditional processing and generates a valid control word.

The invention provides an alternative in which a reinstatement request can be sent to a subscriber device. This request may follow an earlier revocation request sent in error, for example. The purpose of such a request is to once again authorize a subscriber device to generate valid control words. Likewise, the invention provides a predetermined value $u_a$ that is characteristic of such a request. To cancel a revocation of a device, a content server according to the invention transmits a tag $t=u\|v\|cp$, for which u and v are respectively equal to $u_a$ and the identifier i of the device affected by the request.

Upon receiving a tag $t=u\|v\|cp$, the values u, v and cp are extracted by the means 12 of the device. The means 14 compare 107 the value of the component u with the predetermined value $u_a$. If $u=u_a$ and $v=i$ (step 110), the processing means of the device reinitialize 111 an expiration date $cp^e$ equal to ∅—indicating that there is no expiration. The subscriber device is once again able to deliver valid control words. If the value of v is different from the value of the identifier i of the device, the latter continues its traditional processing or remains revoked. Such a request to cancel a revocation or for reinstatement can alternatively amount to an initialization request. In that case, it is possible to initialize the initialization date $cp^b$ at the current value of cp, the revocation then amounting to the definition of an initialization date that is much greater than the current or infinite cryptoperiods.

Although it has been illustrated primarily in connection with the first preferred embodiment of the invention (FIG. 5b), such a method for revoking or reinstating a subscriber device can be implemented irrespective of the embodiment of a conditional access system according to the invention.

The invention claimed is:

1. A method for generating a control word, said method being implemented by a processor of a subscriber electronic device cooperating with a terminal, said device comprising an interface for receiving data from the terminal and for delivering said generated control word to the terminal, said method comprising:
   receiving, by the interface, data that comprise a tag t, wherein the tag t includes data identifying a current cryptoperiod;
   determining, by a processor, the current cryptoperiod by using the identifying data included in the received tag t;
   generating, by the processor, a control word from said current cryptoperiod cp and a secret $SK_i$ stored by the device, wherein the generated control word is a traceable control word $k_{i,cp}$ whereof the value is distinct from that of a control word generated, for the current cryptoperiod cp, by any other subscriber device by integrating the value of an identifier i into the calculation of the word $k_{i,cp}$, said value of the identifier i being stored by the device and distinct from that stored by any other subscriber device; and
   delivering a control word k' using the interface of the subscriber electronic device;
   wherein:
   delivering the control word comprises delivering k' equal to $k_{i,cp}$; and
   the control word is generated such that the terminal is configured to use the control word to decode an encoded content C and generate plain text M of the content by receiving the control word and a header H by:
   i. applying a first function F1 to the header H and control word k' to generate a word K independent of the identifier i of the subscriber electronic device by eliminating the contribution of said dedicated identifier i;
   ii. applying a second function F3 to said word K and to the encoded content C to generate the plain text M of the content; and
   iii. delivering said plain text M of the content via an interface of the terminal.

2. The method according to claim 1, further comprising storing the secret $SK_i$ in a memory of the device.

3. The method according to claim 1, further comprising authorizing, by the processor, the device to generate a control word.

4. The method according to claim 1, further comprising authorizing, by the processor, the device to deliver a control word k' equal to the generated control word $k_{i,cp}$.

5. The method according to claim 3, wherein authorizing the device comprises comparing the cryptoperiod cp deduced from the tag t to an activation date ($cp^b$) stored in said device and authorizing the device if said cryptoperiod cp is greater than said activation date.

6. The method according to claim 3, wherein authorizing the device comprises comparing the cryptoperiod cp deduced from the tag t to an expiration date ($cp^e$) stored in said device and authorizing the device if said cryptoperiod cp is smaller than said expiration date.

7. The method according to claim 1, further comprising writing, in the memory of the device, a cryptoperiod value previously deduced from the tag t, as an expiration date ($cp^e$), if said tag t comprises a component u whereof the value ($u_r$) is characteristic of a revocation request and if said tag further comprises a component v designating the identifier i of the device.

8. The method according to claim 6, further comprising erasing, in a memory of the device, an expiration date ($cp^e$) if said tag t comprises a component u whereof the value ($u_a$) is characteristic of a reinstatement request and if said tag further comprises a component designating the identifier i of the device.

9. A method for encoding plain text M of content and generating encoded content C, said method being implemented by a processor of a server comprising an interface for delivering said encoded content C to a terminal and cooperating with a subscriber device, said method comprising:
   generating, by the processor, an encoded content C from a cryptoperiod cp and a secret MK known by the server;
   generating, by the processor, a tag t to characterize the cryptoperiod cp from which the encoded content C was generated and allowing the device to generate and deliver a traceable control word;
   calculating, by the processor and delivering a header H to enable decoding of the content encoded by the terminal according to claim 1; and
   jointly delivering, by the interface, said encoded content C, said header H and said tag t.

10. A server, comprising processing means to generate and deliver to the outside world, using a method according to claim 9:
    an encoded content C from the plain text of a content, a cryptoperiod cp and a secret MK;
    a tag t;
    a header H.

11. A method for tracing a control word $k_{p,cp}$ generated by a traitor subscriber device, using a method according to claim 1, comprising:
    collecting the control word $k_{p,cp}$;
    collecting a utility or pirate decryption program capable of decoding encoded content using said control word $k_{p,cp}$; and
    determining an identifier i=p of a device having generated $k_{p,cp}$ comprising:
    iii. interpreting the utility or decryption program to design an equivalent program expressing a set of instructions in the form of algebraic and related operations, each comprising at least one input variable and at least one output variable;
    iv. setting the input variables to constants so that the equivalent program decodes the encoded content correctly;
    v. simplifying said equivalent program so that it only comprises one sequence of instructions without jumps;
    vi. converting the simplified equivalent program into a system of multivariate equations by using algebraic transformations;
    vii. inverting all or part of said system of multivariate equations to identify the traitor device.

12. A method for conditional access to digital content, comprising:
   generating and delivering, by a server, an encoded content C, a tag t and a header H;
   receiving said encoded content C, tag t and header H by a terminal;
   transmitting the tag t by the terminal to a device cooperating with said terminal;
   generating and delivering by said device to the terminal, a traceable control word $k_{i,cp}$ according to claim 1;
   decoding by the terminal of the encoded content C and generating the plain text M of the content; and
   rendering said plain text M of the content using an interface adapted to said plain text of the content.

13. A method for conditional access to digital content, comprising:
   generating and delivering, by a server, an encoded content C and a tag t characterizing the cryptoperiod cp from which the encoded content C was generated;
   receiving said encoded content C and tag t by a terminal;
   transmitting the tag t by the terminal to a device cooperating with said terminal;
   generating and delivering, by said device to the terminal, a traceable control word $k_{i,cp}$ and a header H;
   the decoding by the terminal of the encoded content C and for generating the plain text M of the content using a method according to claim 1; and
   rendering said plain text M of the content using an interface adapted to said plain text of the content.

14. A subscriber electronic device cooperating with a terminal, said device comprising:
   an interface for receiving data from the terminal comprising a tag t, wherein the tag t includes data identifying a current cryptoperiod;
   a memory for storing an identifier i and a secret $SK_i$; and
   a processor configured to determine the current cryptoperiod by using the identifying data included in the received tag t and generating a control word from said current cryptoperiod cp and the secret $SK_i$ stored by the memory, wherein the generated control word is a traceable control word $k_{i,cp}$ whereof the value is distinct from that of a control word generated, for the current cryptoperiod cp, by any other subscriber device by integrating the value of an identifier i into the calculation of the word $k_{i,cp}$, said value of the identifier i being stored by the device and distinct from that stored by any other subscriber device,
   wherein:
   the interface is further configured for delivering a control word k' to said terminal,
   delivering the control word comprises delivering k' equal to $k_{i,cp}$, and
   the processor is configured to generate the control word such that the terminal is configured to use the control word to decode an encoded content C and generate plain text M of the content by receiving the control word and a header H by:
      iv. applying a first function F1 to the header H and control word k' to generate a word K independent of the identifier i of the subscriber electronic device by eliminating the contribution of said dedicated identifier i;
      v. applying a second function F3 to said word K and to the encoded content C to generate the plain text M of the content; and
   delivering said plain text M of the content via an interface of the terminal.

15. A system for conditional access to digital content, comprising a server, a terminal and an electronic device respectively according to claim 14.

16. A system for conditional access to digital content, comprising a server comprising a processor to generate a tag t, an encoded content C from the plain text M of the content, a cryptoperiod cp and a secret MK, a terminal and an electronic device, respectively according to claim 14.

17. An electronic terminal comprising:
   an interface for receiving data from the outside world; and
   a processor configured for generating plain text M of the content from said received data, wherein
   the interface is further configured for delivering said plain text of the content to a man-machine interface suitable for rendering said plain text of the content and
   for cooperating with a subscriber electronic device,
   wherein:
   the data received from the outside world comprises an encoded content C, a header H and a tag t;
   the interface transmits to the subscriber electronic device said tag t and in return receive a traceable control word $k_{i,cp}$ that is generated and delivered by said device; and
   the processor is further configured for decoding and delivering the plain text M of the content by
   applying a first function F1 to the header H and the traceable control word $k_{i,cp}$ to generate a word K independent of the identifier i of the subscriber electronic device having generated and delivered the control word $k_{i,cp}$ by eliminating the contribution of said identifier i,
   applying a second function F3 to said word K and to the encoded content C to generate the plain text of the content, and
   delivering said plain text M of the content via the interface of the terminal,
   wherein the traceable control word $k_{i,cp}$ is generated and delivered by said subscriber electronic device from a current cryptoperiod cp determined using data included in a tag t received by the subscriber electronic device and a secret $SK_i$ stored by the subscriber electronic device.

* * * * *